US00RE39770E

(19) United States
(12) Reissued Patent
Promutico

(10) Patent Number: US RE39,770 E
(45) Date of Reissued Patent: Aug. 14, 2007

(54) METHOD OF PLAYING A DICE GAME

(76) Inventor: Rocco R. Promutico, 3235 Osborn Ter., Toms River, NJ (US) 08753

(21) Appl. No.: 10/689,581

(22) Filed: Oct. 20, 2003

Related U.S. Patent Documents

Reissue of:
(64) Patent No.: 6,508,469
Issued: Jan. 21, 2003
Appl. No.: 09/864,674
Filed: May 25, 2001

U.S. Applications:
(62) Division of application No. 09/391,445, filed on Sep. 8, 1999, now Pat. No. 6,273,423.

(51) Int. Cl.
*A63F 3/08* (2006.01)
*A63F 9/04* (2006.01)

(52) U.S. Cl. ..... 273/274; 273/146; 463/22
(58) Field of Classification Search ..... 273/274, 273/146; 463/16, 22
See application file for complete search history.

(56) References Cited

U.S. PATENT DOCUMENTS 4,015,850 A * 4/1977 Russell ..... 273/269
4,930,780 A * 6/1990 Goodman et al. ..... 273/146
5,133,559 A * 7/1992 Page ..... 273/274
5,265,881 A * 11/1993 Doherty ..... 273/274
5,350,175 A * 9/1994 DiLullo et al. ..... 273/146
5,456,467 A * 10/1995 Hoover ..... 273/146
5,505,457 A * 4/1996 Boylan et al. ..... 273/274
5,513,850 A * 5/1996 Vancura ..... 273/274
5,542,671 A * 8/1996 Stewart ..... 273/146
5,620,183 A * 4/1997 Skratulia ..... 273/146
5,649,704 A * 7/1997 Dobbin ..... 273/268
5,700,010 A * 12/1997 Mimier ..... 273/292
5,806,847 A * 9/1998 White et al. ..... 273/309
6,062,563 A * 5/2000 de Keller ..... 273/274

* cited by examiner

*Primary Examiner*—Benjamin Layno
(74) *Attorney, Agent, or Firm*—Raymond A. Nuzzo

(57) ABSTRACT

A novel game and board or surface is played in combination with two sets of playing pieces consisting of three dice each, one set being visibly distinguishable from the second set and wherein in one embodiment all bets are placed on the board or surface before the first set of dice is throw to speed up the method of play and payoffs for each bet are set by the house. Optionally, the house may set and take additional bets between a throw of the first set of dice and a throw of the second set of dice. In another embodiment of the invention, players use the two sets of dice in sequence wherein winning bets are related to poker hands such as open numbers from 3-35; 3 of a kind; 4 of a kind; 5 of a kind, straight; any 3 pair; 6 of a kind, and six sixes (but specifically excluding two of a kind to provide decisive winning odds for the house) and where the payoffs for each bet are 2 for 1, 3 for 1, 4 for 1, 5 for 1, 8 for 1, 8 for 1, 12 for 1, and 20 for 1, respectively, for example. In yet another embodiment of the invention, odds for all bets are again set by the house and a defined whole or percentage of the remaining losing bets form a progressive pot for 6 of a kind and/or six sixes comprises part of the betting.

30 Claims, 2 Drawing Sheets

METHOD OF PLAYING A DICE GAME

Matter enclosed in heavy brackets [ ] appears in the original patent but forms no part of this reissue specification; matter printed in italics indicates the additions made by reissue.

This is a divisional application of application Ser. No. 09/391,445 filed Sep. 8, 1999 now U.S. Pat. No. 6,273,423. Applicant claims the benefit of the filing thereof for all commonly disclosed subject matter.

BACKGROUND

1. Field of the Invention

The present invention relates to casino games, and more particularly, but not by way of limitation, to a wagering game employing dice in combination with common poker-like winning hands that is intended to be played in gambling casinos, but which game can also be played in non-gambling settings. Even more particularly, the instant invention is intended to give a novel and new look and feel to the currently popular games of craps and poker, yet have simplified rules and procedures designed both to encourage use by novice gamblers and to increase the betting decisions per hour to maximize casino profit.

2. Description of the Prior Art

Games of chance employing dice are as old as the invention of dice themselves. The concept of using dice boxes in which to play dice games is also old. Even so, the prior art discloses many novel dice box apparatuses and many novel dice games to be played in them. Dice games generally employ one or more dice which, when thrown or rolled upon a horizontal surface, determine a score based upon indicia displayed by the upwardly facing sides or faces of the resting dice. Each die is in the form of a six sided cube, and each side commonly has thereon different quantities of spots respectively representing the numbers 1, 2, 3, 4, 5 and 6. U.S. Pat. No. 2,657,065 is one such game wherein dice are projected at a cylindrical chamber, the score being determined by the score on the dice which hit the chamber. U.S. Pat. No. 4,247,114 discloses a game board with a walled center player area. U.S. Pat. No. 4,648,602 discloses a hexagonal dice box, with a circumferential rim on which score may be kept. Dice thrown into a dice box can occasionally result in a miss, wherein the dice miss the box or fly out of it after being thrown. When this happens, the dice are usually retrieved and thrown again. However, a game such as the present invention which allows the player an opportunity to improve his score when he throws again, combined with a double dice box provides a novel and entertaining way to play dice.

U.S. Pat. No. 4,430,780 issued in 1990 to Goodman et al. discloses a method of playing a dice game wherein a dice box having two play compartments is separated by a common wall, one compartment of which is used to catch the dice when thrown, the second compartment acting as a holding area in which dice are placed that have been counted in scoring, taking them temporarily out of action. The game is played with six dice. Ones, fives and certain multiple combinations are scored. Players may re-throw any dice which miss the play compartment, and any score changes being caused by one die hitting another in the play compartment are counted. A player must voluntarily surrender his turn while still accumulating score in order for that score to be counted; if he fails to score on any throw of the dice, any score accumulated during that turn is canceled.

U.S. Pat. No. 5,350,175 which issued in 1994 to DiLullo et al. discloses a method of playing a novel betting game with dice. A playing surface includes numerical zones that represent the possible outcomes of the sum of either two rolls of a pair of dice or three rolls of a pair of dice. Certain of these zones are defined as walls, and the other zones are provided with payout rewards. In play, a number of players place "survival" bets. One player is selected to begin rolling the pair of dice until either the maximum number of rolls is achieved without hitting a wall, or the sum of each roll of the dice falls within a wall. If the sum of the rolls of the dice falls within a wall, the survival bets are collected, the dice are passed to another player, and the game begins again. Otherwise, the appropriate payout reward is paid to each player who made a survival bet. Other single-roll side bets may be included for allowing players to bet upon the chance outcome of high numbers, low numbers, doubled, or a natural 12.

U.S. Pat. No. 5,456,467 which issued in 1995 to Hoover discloses a method of playing a poker dice game for entertaining players. The inventive game utilizes a plurality of dice and may include score cards, a rule book, a dice agitator cup, and a storage box. A method of play of the game includes rolling up to five dice and computing a score in accordance with the numbers generated. Score is kept for each player with the winner being declared as the player obtaining a score within a predetermined scoring window or spread.

U.S. Pat. No. 5,542,642 was issued to Stewart in 1996 and discloses a novel casino game using three dice, one having the color red and the other two having bodies of white. The red die is rolled first followed by a roll of the two white dice. A better wins when the two white dice show a total number larger than the number on the red die and the total number on the white dice and the number on the red die are both odd or both even. Payoff ratios can be varied and various side bets, depending upon the outcome of the dice rolls may be arranged.

U.S. Pat. No. 5,620,183 which issued in 1997 to Skratulia discloses and claims a novel set of dice for producing a range of numerical values as well as a method of using the novel set of three die for producing a range of numerical values and includes a plurality of dice each having a representation of a selected number disposed on each of its six sides. In one embodiment the set of dice includes first die, a second die, and a third die, and the range of numerical values produced is one through eight. In a second embodiment the set of dice includes a different first die and a different second die, and the range of numerical values produced in one through nine.

Later in 1997 U.S. Pat. No. 5,649,704 was issued to Dobbin for a method of playing a dice game of the type wherein points are accumulated based upon the scores received for various combinations of numerical values displayed from a roll or throw of a plurality of dice, and by increasing a thrown score and deducting from or adding to the accumulated score this increased score based upon a roll of a die. The dice game comprises the steps of providing six playing dice; providing a bonus die having six faces, three faces having "DOUBLE" marked thereon and three faces having "TRIPLE" marked thereon; establishing an initial order of play; initiating play by throwing the playing dice for displaying a side of each die, wherein each player in turn throws the dice in an attempt to achieve a score of 10,000 points to be declared a winner; wherein upon reaching a score of 650 points a player may choose to "dare," whereby, the player throws the bonus die and doubles or triples the thrown score as indicated by the displayed face of the bonus die, and the player throws a playing die, whereupon throwing a one or a five the player adds the increased thrown score to the accumulated score and whereupon throwing a two, three, four or six the player deducts the increased thrown score from the accumulated score.

U.S. Pat. No. 5,806,847 issued to White et. al of Las Vegas on Sep. 15, 1998 for a game of chance having a playing surface including a plurality of betting areas. The betting areas have a plurality of betting squares for wagering upon a selected result produced by a random result selector such as dice. In one embodiment, the random result selector comprises plurality of dice having a plurality of faces, each face embossed with either a number or a special symbol. Each betting square contains result indicators that correspond to a selected one of the plurality of results. In addition, each betting square contains payoff indicator that indicates the payoff associated with a winning wager on the selected betting square. A single random result leads to a final and unequivocal outcome of all bets made on all betting squares. The playing surface is adapted to be placed over existing casino equipment, or may be used alone. Virtually all casinos, especially those in the gaming capitals of the world, have board games that are played for gambling purposes. The oldest and most popular board games involve the use of dice to determine the outcome of wagers. Of these games, the most popular and well known is the game of craps. Craps has the reputation of being one of the fastest and most exciting table games offered by casinos. However, the game of craps presents various betting schemes that appear complicated to the uninitiated and the speed of play intimidates the beginner. As a result craps has a reputation of being difficult to learn and play. As a result, although craps is generally perceived to be exciting and attractive, many casino patrons are intimidated and discouraged from playing. This results in lost business for the casinos, and less gaming diversity for the gambling public. As an example of the complexity presented by the prior art gaming table games employing dice, a brief summary of the wagering and playing rules of craps follows. Craps revolves around the player who handles the dice, referred to as the "shooter." All players at the table essentially wager either with or against the shooter. That is, every player at the craps table wagers whether the shooter will "make a pass" and win the game or fail to make a pass and thereby lose control of the dice to the next shooter. The game of craps is initiated when a new shooter is first given the dice to throw what is referred to as the "come-out" roll. However, to be eligible to throw the "come-out" roll, the shooter must wager some money or the equivalent, usually the house minimum wager, on either the "pass" or "don't pass" field located on the craps table. There are, of course, many other wagers that are possible in addition to this one, but this initial wager must be made before the shooter may roll the dice. The other players at the table have unrestricted wagers available to them. There are many "side" bets that can be placed, each having different odds of success and rates of return.

Disadvantageously, there are no markings on the craps table to indicate either the odds of success or the return on investment for any particular wager. As a result, only experienced players comprehend the risks involved in placing these side bets and, consequently, most casual players do not partake of this form of wagering. The object of craps is for the shooter to make a pass and continue throwing the dice. There are two identical cubical six-sided die used in craps. Referred to collectively they are referred to as the dice. Both die have dimples or dots embossed on their six sides. Each separate side thus represents a number corresponding to the number of dimples on that side. Each separate side of a single die is dimpled to represent a unique single number from one to six. Two dice are simultaneously rolled by a shooter which must come to rest with an upper face corresponding to an integer number from one through six. Thus the sum of the two upward faces must be an integer number from 2 through 12. The laws of probability dictate the chances of obtaining any one particular sum. The least likely sums are a 2 or a 12 with the most likely sum being a 7. After placing a wager on either the "pass line" or the "don't pass line", the shooter rolls the dice onto the craps table. If the total of the dice rolled is equal to either 7 or 11, the shooter has passed; i.e., the "pass" line wagers win and the "don't pass" line wagers lose. If the shooter rolls a "craps"—a total of either 2, 3, or 12—the "pass" line wagers lose and the "don't pass" line wagers win. If any other total results from the come-out roll, a 4, 5, 6, 8, 9, or 10, the shooter has established what is referred to as the "point."

Once the point is established, the house dealer places a white marker on a space on the table bearing the number corresponding to the point. If the shooter repeats the point before rolling a 7, the shooter once again "passes"—the pass line wagers win and the don't pass wagers lose. However, if the shooter rolls a 7 prior to repeating a roll of the point, the shooter does not pass, or "seven-out", and the pass line wagers lose while the don't pass line wagers win. After a shooter "sevens-out", the dice are transferred to the next player, and the next player becomes the new shooter. Once a point is established, only a roll totaling that point, or a roll totaling "seven," will determine whether a pass line bet is won or, in the case of a "seven" roll, lost. All other numbers thrown in the interim affect only the success or failure of "side bets." Players may make side bets anytime during the play of the game. There are several areas on the craps table that are designated for side bets. For example, a side bet may be placed on either of the numbers 6 or 8 by placing money in the area designated for that wager. A 6 or 8 place bet is successful if the 6 or 8 is rolled, prior to the rolling of a 7. The 6 or 8 bet loses when a 7 is rolled, except on the come-out roll. The 6 and 8 place bet return a payoff of 7 to 6. Place bets made on the 5 and 9 return a payoff of 7 to 5, and place bets on the 4 and 10 return a payoff of 9 to 5.

The payoffs are apportioned to adequately reward players who have risk a wager on a given number but not yet quite adequately compensate them in proportion to the risk they have taken. The difference is the house take. Since there is a house take on every bet made it is clear that for the house to maximize its profits it should maximize the number of bets decided per unit time.

Disadvantageously, the craps table playing surface does not indicate the availability, the payoffs, or the duration of the side bets. Different side bets are in effect for different periods of time. Some are effective for one roll only; others remain in effect until the shooter either "sevens-out" or makes the point. Nowhere on the craps table is there an indication of the duration of a side bet. Consequently, even experienced craps players often hesitate before placing such wagers, resulting in lost betting opportunities for them, and lost revenue for the casino. Novice craps players are even more hesitant to place wagers. Additionally, because payoffs are not indicated on the table, only experienced craps players are able to appreciate the risks involved in making these wagers. However, the great number of possible bets causes even experienced players to occasionally forget the odds and payoffs associated with one or more particular wagers, which in turn results in slow play and disruption to the flow of the game. For example, because the odds are not indicated on the craps table, players must often ask what the payoff is on a particular side bet. This results in less wagering decisions per hour for the casino, less revenue, and ultimately, diminished enjoyment for the players.

Due to the complexity involved in playing the popular wagering games employing dice, as exemplified by the brief summary of craps given above, there is a need for a simpler game of chance that will appear all strata of expertise in the art of gambling, yet remain challenging and enjoyable. Although craps is a popular table game, there are relatively few wagering options, and even these few options are not intuitively obvious nor readily apparent to the casual observer. Furthermore, the shooter rolls the dice until he or she "seven's out," and therefore, the dice are not passed from player to player in rapid succession. Moreover, the payoffs and odds of success are not generally known to the betting public, not easily discernable from observing the game, and gambling is thereby discouraged.

The pace at which craps is played is intimidating, leaving little opportunity for the novice player to acquire knowledge of the game. Consequently, the number of players who play craps has declined over the years, and is likely to so continue. Another extremely popular game currently found in most casinos is the game of roulette, the rules of which are widely published. This game provides more betting options than does craps, but the game involves somewhat complicated hardware. This increases the complexity of the game and associated operational overhead.

The great advantage with roulette, which leads to its popularity, is its simplicity and accessibility to the ever-increasing numbers of novice gamblers. For example, players can wager on individual numbers, which payoff at very high odds, or on black or red, or even or odd results. In addition to the easily understood rules and betting options, roulette offers tremendous betting advantages to the casino, which ultimately results in more casino revenue. Moreover, the number of wagers decided per hour, or "decisions per hour", is much higher in roulette than in craps. For example, in craps, because the time to either make a point or seven-out is indefinite, it may take several minutes to determine the outcome of a particular pass line wager. In contrast, a wager in roulette is decided on every turn of the roulette wheel. Consequently, roulette yields more money to the casino over a shorter period of time.

Another extremely popular game currently found in most Las Vegas casinos is the game of poker, the rules of which are widely published and have numerous variations. This game provides numerous betting options, but the game involves somewhat complicated and increasing or decreasing odds depending on the number of decks of cards used. Winning hands may include two pairs, three of a kind, four of a kind, and straights. The novel game is significantly distinct from poker in that it also includes five of a kind, six of a kind, and six sixes, as well as elements of roulette. This makes the novel game attractive to those who usually enjoy roulette, as well as craps, progressive slots, and poker.

The complexity of the novel game over the prior art games is substantially diminished and the novel method enables the game to move quickly thereby decreasing the associated operational overhead. The great advantage with roulette, which leads to its popularity, is its simplicity and accessibility to the ever-increasing numbers of novice gamblers. Disadvantageously, roulette does not allow players to fully participate in the game. In most casinos, particularly those found in the gaming capitols of the world, the ball and wheel are handled only by dealers and others who represent the casino. One of the most appealing and desirable features of any gaming activity is the ability for a member of the betting public to directly participate in determining the outcome of wagers. Craps, for example, has been noted as being especially enjoyable because the players are allowed to handle the dice and ultimately determine the outcome of the wagers. Similarly, slot machines are popular largely because the player is allowed to handle the equipment that determines the success or failure of her wager. Even if other factors are involved, it is advantageous to increase the perception that the player has an influence on the outcome of the game. Therefore, despite the popularity of both craps and roulette, these games present several disadvantages to the casinos and players alike. Although there have been attempts to improve upon existing games and to develop new games of chance, none of the prior art games have been able to overcome the disadvantages described herein above. A need exists for a wagering game employing dice or their electronic equivalent that is intended to be played in gambling casinos, that is simple to learn and play, and that results in more wagering decisions per hour and increased revenues for the casino.

U.S. Pat. No. 5,228,698, issued to A. P. Dubarry, Jr. on Jul. 20, 1993 discloses a board game with printing thereon which uses dice from time to time. Wagers or bets may be required depending on the outcome of the dice roll. By contrast, the game of the instant invention requires at least one wager prior to the roll of the dice and requires that the outcome of that wager be fully determined by the single roll of the dice.

U.S. Design Pat. No. 263,975, issued to John S. Quiroga, et al. on Apr. 20, 1982, discloses an ornamental design for a gaming table. By contrast the instant invention is not directed to any sort of ornamental appearance of a game table although playing considerations dictate certain broad geometric relationships between the various play areas on the table. In addition, the required geometric relationships of the instant invention, a craps-type dice game, are far removed in appearance and function from the black-jack-type table of Ouiroga, et al.

U.S. Pat. No. 5,308,081, issued to Richard J. E. Bartle on May 3, 1994, discloses a three dice betting game with a game board having various betting areas corresponding to various dice roll outcomes. Payoffs for various outcomes are printed on the playing surface of Bartle. However, the disclosed method of playing the Bartle game makes it abundantly clear that multiple rolls of the dice are required to determine the outcome of the wagers. By contrast, the instant invention is arranged such that the outcome of all wagers is fully and finally decided after each and every roll of the dice. None of the above prior art games, inventions and patents, taken singly or in any combination, is seen to describe the instant invention as claimed.

OBJECTS OF THE INVENTION

For the foregoing reasons, there is a need for a combination of variety and simplicity of betting wherein a winning bet is easily recognized. In many of the prior art dice games six dice are thrown and points are scored or accumulated by throwing "triplets." While these games provide a means for a number of players to compete they do not provide the added challenge of receiving points for throwing different poker-like combinations of dice. These prior art games, further, do not provide a means of providing suspense and also allowing a winning bet at each successive throw. The prior art games are to a great extent based on accumulated point value of the throw. It would be a benefit, therefore, to have a dice game allowing players to compete against one another by throwing poker-related face of the die combinations such as two of kind, three of a kind, four of a kind, five of a kind, six of a kind, any three pair, a straight, and substantially equally difficult-throwing six sixes, based on throwing these various combinations of dice. It would be a further benefit to have a dice game that has a second set of die for rolling to either double or triple a thrown score after a number of points have been accumulated during a first throw.

It would be an additional benefit to have a dice game in which a group of three die of one color or design is thrown to determine the extent to which the score is increased for bets above a certain numerical value.

The gaming method disclosed is designed to quickly build excitement and anticipation with only two successive rolls of the dice per game, and as such is intended as a quick paced and an unusually exciting game to play and/or observe.

SUMMARY OF THE INVENTION

In a first embodiment, the present invention is directed to a novel game and board or surface in combination with two sets consisting of three dice each, one set being visibly distinguishable from the second set and wherein all bets are placed on the board or surface before the first set of dice is throw to speed up the method of play and payoffs for each bet are set by the house. Optionally, the house may set and take additional bets between each pair of throws comprising a throw of the first set of dice and a throw of the second set of dice. In another embodiment of the invention, a novel method of play uses the two sets of dice in sequence wherein winning bets are related to poker hands such as open numbers from 3-35; 3 of a kind; 4 of a kind; 5 of a kind, straight; any 3 pair; 6 of a kind, and six sixes (but specifically excluding two of a kind to provide decisive winning odds for the house) and where the payoffs for each bet are 2 for 1, 3 for 1, 4 for 1, 5 for 1, 8 for 1, 8 for 1, 12 for 1, and 20 for 1, respectively, for example. In yet another embodiment of the invention, odds for all bets are again set by the house and a defined whole or percentage of the remaining losing bets form a progressive pot for 6 of a kind and/or six sixes comprises part of the betting.

The present invention solves the problems presented in the prior art by providing a novel method and apparatus for playing a dice game of chance which uniquely combines features of roulette, poker, craps, and progressive slot machines. The apparatus comprises a differentiated pair of sets of three standard dice, each set being of a different color, for example; and a playing surface marked with a plurality of spaces for different bets on selected combinations of outcomes from throws of the dice.

The spaces may also accommodate money, casino chips, or the like, and a marker to indicate the results of the last roll of the dice and/or the winner of a progressive jackpot. In a variant of the invention, electronic dice may be used instead of the physical cubes generally referred to as dice. Electronic dice are understood to be dual random number generators that each randomly display with equal likelihood one of six possible outcomes. Thus, the dual displays represent a realistic simulation of actually rolling cubical dice. Throughout the remainder of this disclosure the term dice shall be taken to mean either physical or electronic dice.

The present dice game, while exhibiting many valuable gaming features, as explained below in more detail, also can be inexpensively manufactured and incurs minimal operational overhead expenses. While the present invention may, in one embodiment, comprise a separate, approximately five-foot by eight-foot rectangular table, the present playing surface may be formed as a thin overlay to be placed atop existing casino game table equipment such as craps tables. In addition, if there are an insufficient number of players to warrant operating a full table, the table may be split in half, with one half of the table unoccupied, and the other half utilized for playing the game. Advantageously, the operational expenses associated with the present game are low. To operate the present game, the casino need only employ one dealer. Moreover, the game can easily be played with artificial money at home as a family recreation.

The game has a minimal number of rules, and the rules are readily apparent to the novice gambler after very little observation.

In the case of electronic dice an actuating button or similar device would be made accessible to each player on a rotating basis. In one preferred embodiment, if the "rolling player," or "shooter," wins his or her bet, the shooter continues to roll the dice. Otherwise, the dice are passed to the next player. In an alternative embodiment, there is a new shooter after each and every roll of the dice. Therefore, the present game advantageously increases the number of players directly involved in the ultimate outcome of the game, and thereby increases player participation and satisfaction.

The playing surface is divided into a plurality of discrete areas that are used for different wagering purposes. In one preferred embodiment, the table layout makes available twenty-five different wagering spaces or combinations. A player wagers on the outcomes of any selected roll of the dice by placing a wager in a space dedicated for the selected wager. The spaces or betting areas on the table correspond to all possible results or combinations of the two *sets of three* dice. The player wins the wager if the combination of the [two] symbols shown on the dice corresponds to the combination upon which the player wagered. Additionally, in the preferred embodiment, the individual combinations may be combined into other wagers, referred to as "field" or "line" wagers. If the player places a field or line wager, the player wins the wager if the [two] symbols shown on the dice after the roll correspond to any of the several dice combinations covered by the field wager. In the preferred embodiment, the playing surface also indicates the payoffs or returns on investment for each possible roll combination. Therefore, each time that a player places a wager, the player may easily determine what the return will be if the wager is successful. No a priori knowledge of the odds or payoffs is necessary for the player to be able to determine the return on his investment. This provides a significant advantage over the prior art games of chance employing dice.

In the preferred embodiment of the present game of chance, every wager is effective until each set of three dice is thrown or rolled. A game is over after only two rolls of dice. Therefore, in contrast to the prior art games, such as craps, the present game produces more wagering decisions, successes or failures, per hour. This results in more overall revenue for the casino. Moreover, the present invention yields a higher advantage to the casino than do the prior art games. Thus the present invention represents a substantial improvement over casino games of the prior art because it simplifies play and encourages wagering, which in turn leads to increased entertainment and increased revenue for the casino.

BRIEF DESCRIPTION OF THE DRAWINGS

These and other features, aspects, and advantages of the present invention will become better understood with regard to the following description, appended claims, and accompanying drawings wherein:

DESCRIPTION OF THE PREFERRED EMBODIMENT

Figure 1:
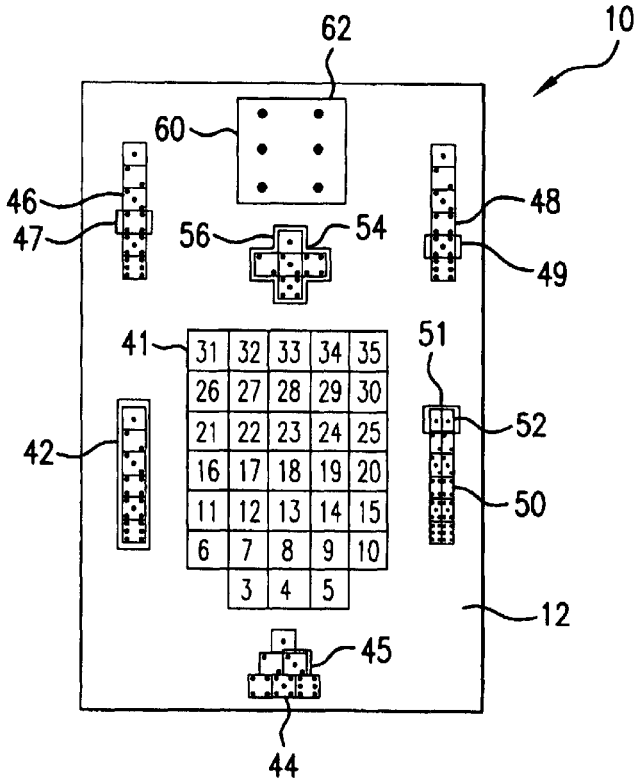
FIG. 1 is a plan view of a first preferred embodiment of the playing surface of the invention.

The present invention will be described hereinafter with reference to the accompanying drawings and the rules of the novel game printed herein which illustrate an embodiment of the board and dice sets and the method of the invention.

The method of the invention incorporates the following rules, to wit:

Rules of the Novel Game

1. The game of six shooters shall be played with a total of 6 dice, 3 of one color and 3 of a different color, thrown on a table or board by the players. The table or board shall consist of different areas for placing various bets. These areas shall be: open numbers from 3-35; 3 of a kind; 4 of a kind; 5 of a kind, straight; any 3 pair; and 6 of a kind, and six 6's.
2. To play the game, the first set of three (3) dice shall be thrown on the table or board and shall be used to pay off any bets on the open numbers of 3-35 by adding the 3 dice together for a total number. This total number shall also be used to pay off any bets of 3 of a kind as a higher odds bet.
3. The first set of dice shall remain on the table or board and shall be included in the betting after the second set of dice are thrown.
4. After the second set of 3 dice are thrown on the table or board, the total number shown on the 6 dice shall pay any bets on the open numbers 3-35 on the table, and this total shall also pay any bets placed on 3 of a kind, 4 of a kind, 5 of a kind, straight, any 3 pair, and six of a kind including six 6's as it appears on the table or board.
5. After all 6 dice are thrown, only exact matches shall be paid on bets. Example: 6 of a kind showing on the dice will only pay 6 of a kind bet, not 5 of a kind, 4 of a kind, or 3 of a kind, etc.
6. After each throw, the house shall pay any matching numbers on the open numbers of 3-35.
7. All bets shall be placed on game table or game board prior to any dice being thrown.
8. Customarily, not bets shall be accepted or placed after the first set of three dice are thrown. Optionally, the house may set and take additional bets between a throw of the first set of dice and a throw of the second set of dice.
9. Odds for all bets shall be set by the house.
10. A progressive pot for 6 of a kind and/or six 6's may be included as part of the betting at the option of the house.

The novel method specified by the above rules is best described by referring first to FIG. 1 where there is shown a board 10 with specific preferred layout on the surface 12. In the novel method six playing dice (shown in FIG. 2) are rolled or thrown onto the surface 12 by a player or shooter (not shown).

Figure 2:
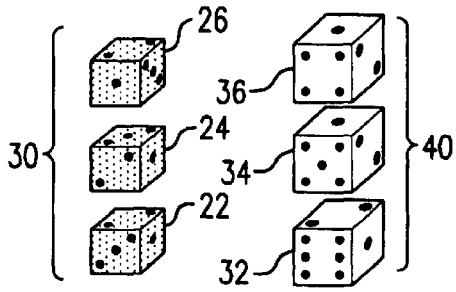
FIG. 2 is a perspective view of a set of six dice, three of one design and three of another design, which form part of the invention; and, FIG. 3 depicts a plan view of a second preferred embodiment of the playing surface of the invention wherein various arrays have informational labels shown nearby.

Shown in FIG. 2 are six playing dice 22, 24, 26, 32, 34, and 36. The dice 22, 24, and 26 make up a first set 30. The dice 32, 34, and 36 make up a second set 40. The novel method of the game is therefore played with a pair of dice sets 30 and 40. Note that the pair shown in FIG. 2 do not match each other.

The first set 30 is visibly distinguishable from the second set 40. This is not a matter of design choice but a necessity of the structure of the operational aspect of the game to decrease the probability and/or prevent an error or issue in determining a winner in the event one or more dice from the second set is accidentally dropped or thrown before the second or final throw. Thus, it is an essential aspect of the novel game that in the event a die from the second set to be thrown is placed on the surface 12 after the first set is thrown, it is easily [discermable] *discernible* and can be removed without placing the particular turn and bets of the game at any turn in jeopardy. The first set 20 is made up of the three dice 22, 24 and 26 which have a darker color than the second set 30, for example. The second set 30 is made up of the three dice 32, 34, and 36.

The novel method is enabled by providing a planar game playing surface, the surface marked as shown in FIG. 1 for example. The surface 12 has at least eight separately delineated areas adapted for the placement of bets.

A first area [40] *41*, as shown in FIG. 1, is an array of 33 contiguous polygons with a number selected from the group consisting of 3 through 35 appearing therein. A second area 42 is shown with a rectangular array of six contiguous polygons each having a spot or spots (and/or an equivalent matching numeral) therein selected from the group consisting of 1 through 6 spots. *The second area 42 is indicative of straight bets.*

A third area 44 is shown with a pyramidal array of six contiguous polygons each having a spot or spots (and/or an equivalent matching numeral) therein selected from the group consisting of 1 through 6 spots. The third area 44 has its polygon 45 containing three spots shown with a bold outline indicative of three of a kind bets.

A fourth area 46, substantially the same as the second area 42 but located above it for example, is shown with another rectangular array of six contiguous polygons each having a spot or spots (and/or an equivalent matching numeral) therein selected from the group consisting of 1 through 6 spots. The fourth area 46 has its polygon 47 containing four spots shown with a bold outline indicative of four of a kind bets. A fifth area 48, substantially the same as the second area 42 but located elsewhere, for example, is shown with another rectangular array of six contiguous polygons each having a spot or spots (and/or an equivalent matching numeral) therein selected from the group consisting of 1 through 6 spots. The fifth area 48 has its polygon 49 containing five spots shown with a bold outline indicative of five of a kind bets.

A sixth area 50, is shown with two side by side, or adjacent, rectangular arrays of six contiguous polygons each having a spot or spots (and/or an equivalent matching numeral) therein selected from the group consisting of 1 through 6 spots. The sixth area 50 has two of its adjacent polygons 51 and 52 each containing one spot, shown with a bold outline enclosing these two polygons as indicative of three pairs bets or "any three pairs of two of a kind" bets.

A seventh area 54, is shown as a cruciform shape, for example, or an array of five contiguous polygons each having a spot or spots (and/or an equivalent matching numeral) therein selected from the group consisting of 1 through 5 spots. The seventh area 54 has all of its polygons shown with a bold outline 56 enclosing all of these five polygons as indicative of [five] *six* of a kind bets exclusive of the bet category consisting of five of six spots.

An eighth area 60, is shown as a single polygon, a square, for example, having six spots (and/or an equivalent matching numeral) therein. The eighth area 60 is shown with a bold outline 62, enclosing all of the area 60 as indicative of six of a six and progressive bets exclusive of the bet category consisting of five of six spots previously described.

Any odds may be assigned or established by the house for payout of winning bets placed in any of the aforesaid eight separately delineated areas. Payout ratios may be from 2 to 1 for the most likely to win bet in integer increments up to 200 to 1 for the least likely to win bet, for example. The house may establish an initial order of play including which players are designated as first player, second player, and so on to a last player.

The game begins by initiating a round of play by a first player establishing a throw by throwing said first set 30 of dice onto the surface 12 for displaying a face-up side of each die within the first set; determining a player's score for the throw by adding the face-up sides of the three dice together; using the score of the first throw to pay any bets on the numbers 3 through 18; using the faces of the three die in the throw of the first set throw to pay any best on "3 of a kind"; displaying the Arabic numerals 3 through 35 in an array of similar geometric areas within a first arena of the delineated areas; displaying six spots in one geometric area of the delineated areas and designating the second arena substantially "6 six's"; displaying each of the six faces of a die in an array of similar geometric areas within a third arena of the delineated areas and designating the third arena substantially as "3 of a kind"; displaying each of the six faces of a die in an array of similar geometric areas within a fourth arena of the delineated areas and designating the fourth arena substantially as "4 of a kind; displaying each of the six faces of a die in an array of similar geometric areas within a fifth arena of the delineated areas and designating the fifth arena substantially as "5 of a kind"; displaying each of five faces of a die exclusive of the face having six spots, in an array of similar geometric areas within a sixth arena of the delineated areas and designating the sixth arena substantially as "6 of a kind"; displaying doubles of each of six faces of a die, in an array of similar geometric areas within a seventh arena of the delineated areas and designating the seventh arena substantially as "any 3 pair"; displaying each of the six faces of a die in an array of similar geometric areas within an eighth arena of the delineated areas and designating the eighth arena substantially as "straight; segregating the first throw of the first set of die on the board with the faces thrown showing and allowing same to remain on the playing surface; initiating another round of play by a player establishing a second throw by throwing said second set of dice onto a surface for displaying a face-up side of each die within the second set; determining a player's score from the second throw by adding the face-up sides of the three dice of the first set and of the second set together to obtain a total from the faces of six dice; including the first set of dice in the betting after the second set of dice is thrown; using the total to pay bets on the numbers 6 through 35; three of a kind, four of a kind, a straight, any three pair, six of a kind exclusive of the six dot face of the dice, and six of six; after the second throw, only paying and determining bets on matches which include all six dice.

Figure 3:
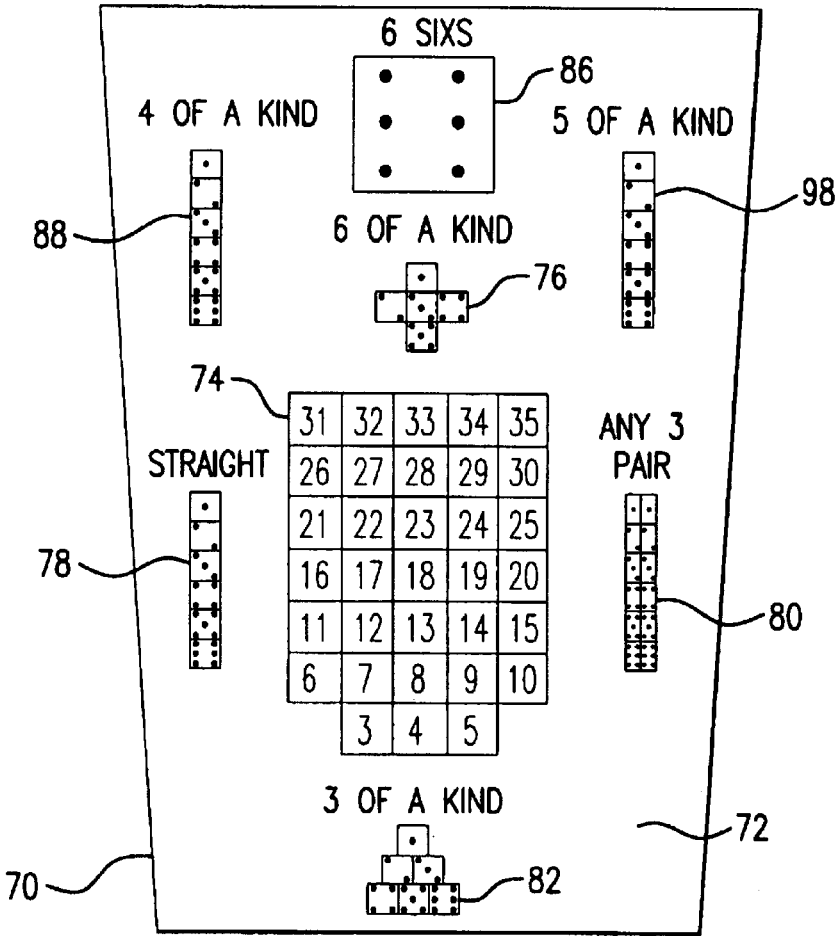

Shown is FIG. 3 is a portion of a dice game wherein another preferred embodiment is made of a board 70 shown with specific designations for each of eight arrays shown thereon. The novel dice game of chance further includes the dice sets 30 and 40 shown in FIG. 2. The board 70 is a substantially flat surface adapted for the game using six die, three die being of one color or design and three die being of another color or design. The surface 72 further includes the following arrays:

(a) a primary substantially rectangular array 74 having at least thirty-three similarly shaped and sized contiguous polygonal areas, each area containing a different numeral selected from the group consisting of 3 to 35;

(b) a cruciform shaped array 76 having at least five similarly shaped and sized contiguous polygonal areas wherein each polygonal area displays spots similar to spots appearing on dice, each polygonal area of the cruciform shaped array displaying a different set of spots selected exclusively from group consisting of one, two, three, four, and five spots, the cruciformed shaped array 76 being located above the primary array and having a printed designation stating "6 of a kind nearby;

(c) a first single column rectangular shaped array 78 having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the primary array; the array 78 having a designation "straight" nearby;

(d) a double column rectangular shaped array 80 having at least twelve similarly shaped and sized contiguous polygonal areas wherein each polygonal area displays spots similar to spots appearing on dice, each laterally adjacent polygonal area of the last said array displaying a pair of a different set of spots selected exclusively from a group consisting of one, two, three, four, five and six spots, the last said array being located on the other of the two sides of the primary array, the array 80 having a designation "any 3 pair" nearby;

(e) a shaped array 82 having at least five similarly shaped and sized contiguous polygonal areas wherein each polygonal area displays spots similar to spots appearing on a die, each polygonal area of the shaped array displaying a different set of spots selected exclusively from a group consisting of one, two, three, four, and five spots, the shaped array being located below the primary array, the array 82 having a designation "3 of a kind" nearby;

(f) a polygonal shaped area 86 enclosing six spots located above and separate from the cruciform array, the area 86 having a designation "6 six's" nearby;

(g) a second single column rectangular shaped array 88 having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the cruciform array, the array 88 having a designation "4 of a kind" nearby; and, (h) a third single column rectangular shaped array 98 having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the cruciform array, the array 98 having a designation "5 of a kind" nearby.

The set 30 consists of dice which are substantially and discernibly smaller than the dice making up the set 40.

It is to be understood that the present invention is not limited to the embodiments described herein, but in accordance with the doctrine of equivalents, including equivalents as to functions as combined with appearance, encompasses any and all embodiments with the scope of the following claims, to wit:

What is claimed is:

[1. A method of playing a dice game comprising the steps of:

providing six playing dice comprising a first set of three dice and a second set of three differentiated dice; providing a planar game playing surface comprising at least eight separately delineated areas adapted for the placement of bets;establishing odds for payout of winning bets placed in any of the aforesaid seven separately delineated areas; establishing an initial order of play where players are designated as first player, second player, and so on to a last player; placing bets on any of said at least eight separately delineated areas initiating a round of play by a first player establishing a throw by throwing said first set of dice onto a surface for displaying a face-up side of each die within the first set; determining a player's score for the throw by adding the face-up sides of the three dice together; using the score of the first throw to pay any bets on the numbers 3 through 18; using the faces of the three die in the throw of the first set throw to pay any best on "3 of a kind"; displaying the Arabic numerals 3 through 35 in an array of similar geometric areas within a first arena of the delineated areas; displaying six spots in one geometric area of the delineated areas and designating the second arena substantially "6 six's"; displaying each of the six faces of a die in an array of similar geometric areas within a third arena of the delineated areas and designating the third arena substantially as "3 of a kind"; displaying each of the six faces of a die in an array of similar geometric areas within a fourth arena of the delineated areas and designating the fourth arena substantially as "4 of a kind; displaying each of the six faces of a die in an array of similar geometric areas within a fifth arena of the delineated areas and designating the fifth arena substantially as "5 of a kind"; displaying each of five faces of a die exclusive of the face having six spots, in an array of similar geometric areas within a sixth arena of the delineated areas and designating the sixth arena substantially as "6 of a kind"; displaying doubles of each of six faces of a die, in an array of similar geometric areas within a seventh arena of the delineated areas and designating the seventh arena substantially as "any 3 pair"; displaying each of the six faces of a die in an array of similar geometric areas within an eighth arena of the delineated areas and designating the eighth arena substantially as "straight"; segregating the first of throw of the first set of die on the board with the faces thrown showing and allowing same to remain on the playing surface; initiating another round of play by a player establishing a second throw by throwing said second set of dice onto a surface for displaying a face-up side of each die within the second set; determining a player's score from the second throw by adding the face-up sides of the three dice of the first set and of the second set together to obtain a total from the faces of six dice; including the first set of dice in the betting after the second set of dice is thrown; using the total to pay bets on the numbers 6 through 35; three of a kind, four of a kind, a straight, any three pair, six of a kind exclusive of the six dot face of the dice, and six of six; after the second throw, only paying and determining bets on matches which include all six dice.]

[2. The method of claim 1 wherein three of the dice are of one design and the other three of the dice are of another design.]

[3. The method of claim 1 wherein the dice game of chance comprises a substantially flat surface adapted for playing a game of dice using six die, three die being of one color or design and three die being of another color or design, the surface further comprising:(a) a primary substantially rectangular array having at least thirty-three similarly shaped and sized contiguous polygonal areas, each area containing a different numeral selected from the group consisting of 3 to 35;(b) a cruciform shaped array having at least five similarly shaped and sized contiguous polygonal areas wherein each polygonal area displays spots similar to spots appearing on dice, each polygonal area of the cruciform shaped array displaying a different set of spots selected exclusively from a group consisting of one, two, three, four, and five spots, the cruciformed shaped array being located above the primary array; (c) a first single column rectangular shaped array having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the primary array; (d) a double column rectangular shaped array having at least twelve similarly shaped and sized contiguous polygonal areas wherein each polygonal area displays spots similar to spots appearing on dice, each laterally adjacent polygonal area of the last said array displaying a pair of a different sets of spots, selected exclusively from a group consisting of one, two, three, four, five and six spots, the last said array being located on the other of the two sides of the primary array; (e) a shaped array having at least five similarly shaped and sized contiguous polygonal areas wherein each polygonal area displays spots similar to spots appearing on a die, each polygonal area of the shaped array displaying a different set of spots selected exclusively from a group consisting of one, two, three, four, and five spots, the shaped array being located below the primary array; (f) a polygonal shaped area enclosing six spots located above and separate from the cruciform array; (g) a second single column rectangular shaped array having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the cruciform array; and,(h) a third single column rectangular shaped array having at least six similarly shaped and sized contiguous polygonal areas wherein each polygonal area displays spots similar to spots appearing on dice, each polygonal area of the last said array displaying a different set of spots selected exclusively from a group consisting of one, two, three, four, five and six spots, the last said array being located on one of two sides of the cruciform array.]

[4. The method according to claim 3 wherein the dice game further comprises six dice, at least three dice being of one color and three dice being of another visibly distinguishable color.]

[5. The method according to claim 3 wherein the dice game further comprises only six dice, three dice being of one design and three dice being of another design.]

[6. The method according to claim 3 further comprising six dice, three dice being of one size and three dice being of another visibly distinguishable, substantially different size.]

*7. A method of playing a wagering game comprising:*

*providing a first group of dice and a second group of dice, each die having a plurality of possible roll outcomes wherein each roll outcome represents a particular numerical value;*

*providing a player with an opportunity to make a wager on at least one number that is in a predetermined group of numbers;*

*providing a player with an opportunity to make an additional wager on at least one of a plurality of possible combinations of roll outcomes that can result from either a roll of the first group of dice or a roll of both the first and second groups of dice;*

*rolling the first group of dice;*

*summing the numerical values represented by the roll outcomes of the dice in the rolled first group of dice to produce a first sum;*

*paying winnings based on any wagers on a number in the predetermined group of numbers that is equal to the first sum;*

*combining the roll outcomes of all of the dice of the rolled first group of dice to arrive at a first resulting combination of roll outcomes;*

*paying winnings based on wagers on the one of the plurality of possible combinations of roll outcomes if the first resulting combination of roll outcomes corresponds to the one of the plurality of possible combinations of roll outcomes;*

*rolling the second group of dice;*

*summing the numerical values of the roll outcomes of the dice in the rolled second group of dice to produce a second sum;*

*paying winnings based on wagers on a number in the predetermined group of numbers that is equal to the second sum;*

*combining the roll outcomes of all the dice of the rolled second group of dice to arrive at a second resulting combination of roll outcomes;*

*paying winnings based on wagers on the one of the plurality of possible combinations of roll outcomes if the second resulting combination of roll outcomes corresponds to the one of the plurality of possible combinations of roll outcomes;*

*summing the first and second sums to produce a total sum;*

*paying winnings based on wagers on a number in the predetermined group of numbers that is equal to the total sum;*

*combining the roll outcomes of all of the dice in the rolled first and second groups of dice to arrive at a third resulting combination of roll outcomes; and*

*paying winnings based on wagers on the one of the possible combinations of roll outcomes if the third resulting combination of roll outcomes corresponds to the one of the plurality of possible combinations of roll outcomes.*

*8. The method according to claim 7 wherein the predetermined group of numbers comprises the group of numbers between 3 and 35, inclusive.*

*9. The method according to claim 7 wherein the predetermined group of numbers comprises the group of numbers associated with the game of roulette.*

*10. The method according to claim 7 wherein the dice in the first group of dice are visually distinguishable from the dice in the second group of dice.*

*11. The method according to claim 10 wherein each die in the first group of dice has a first color and each die in the second group of dice has a second color.*

*12. The method according to claim 10 wherein each die in the first group of dice has a first design and each die in the second group of dice has a second design that is different than the first design.*

*13. The method according to claim 7 wherein all dice are configured as physical dice.*

*14. The method according to claim 7 wherein each die comprises a simulated die.*

*15. The method according to claim 7 wherein the step of providing the first and second groups of dice comprises providing an electronic device comprising a first plurality of electronic dice that represent the first group of dice and a second plurality of electronic dice that represent the second group of dice, the electronic device further including a device to enable players to roll the electronic dice.*

*16. The method according to claim 7 wherein one of the possible combinations of roll outcomes corresponds to a poker-like hand of three-of-a-kind wherein three dice have the same roll outcome.*

*17. The method according to claim 7 wherein one of the possible combinations of roll outcomes corresponds to a poker-like hand of four-of-a-kind wherein four dice have the same roll outcome.*

*18. The method according to claim 7 wherein one of the possible combinations of roll outcomes corresponds to a poker-like hand of five-of-a-kind wherein five dice have the same roll outcome.*

*19. The method according to claim 7 wherein one of the possible combinations of roll outcomes corresponds to a poker-like hand of a straight wherein the dice have roll outcomes in numerical order.*

*20. The method according to claim 7 wherein one of the possible combinations of roll outcomes corresponds to a poker-like hand of three pairs wherein each die in a first pair of dice has a first roll outcome, each die in a second pair of dice has a second roll outcome, and each die in a third pair of dice has a third roll outcome.*

*21. The method according to claim 7 wherein one of the possible combinations of roll outcomes corresponds to a poker-like hand of six-of-a-kind wherein six dice have the same roll outcome.*

*22. The method according to claim 21 further comprising:*

*forming a progressive pot by accumulating lost wagers wagered on the occurrence of a combination of roll outcomes that corresponds to the poker-like hand of six-of-a-kind; and*

*paying to a player the progressive pot if that player has wagered on the occurrence of a combination of roll outcomes that corresponds to the poker-like hand of six-of-a-kind and the resulting combination of roll outcomes does correspond to the poker-like hand of six-of-a-kind.*

*23. The method according to claim 21 wherein one of the possible combinations of roll outcomes is six dice all having a roll outcome with the numerical value of six.*

*24. The method according to claim 23 further comprising:*

*forming a progressive pot by accumulating lost wagers wagered on the occurrence of a combination of roll*

*outcomes defined by all six dice having a roll outcome with the numerical value of six; and*

*paying to a player the progressive pot if that player has wagered on the occurrence of a combination of roll outcomes defined by all six dice having a roll outcome with the numerical value of six and the resulting combination of roll outcomes does yield six dice all having the numerical value of six.*

*25. The method according to claim 7 further comprising providing a player with an opportunity to make additional wagers after the first group of dice are rolled.*

*26. The method according to claim 7 wherein the first group of dice comprises three dice and the second group of dice comprises three dice.*

*27. A method of playing a wagering game, comprising:*

*providing a first group of dice and a second group of dice, each die having a plurality of possible roll outcomes wherein each roll outcome represents a particular numerical value;*

*providing a player with an opportunity to make a wager on at least one number that is in a predetermined group of numbers;*

*providing a player with an opportunity to make an additional wager on at least one of a plurality of possible combinations of roll outcomes that could result from either a roll of the first group of dice or a roll of both the first and second groups of dice;*

*rolling the first group of dice;*

*summing the numerical values represented by the roll outcomes of the dice in the rolled first group of dice to produce a first sum;*

*paying winnings based on any wagers on a number in the predetermined group of numbers that is equal to the first sum;*

*combining the roll outcomes of the rolled first group of dice to arrive at a first resulting combination of roll outcomes and paying winnings based on wagers on the one of the plurality of possible combinations of roll outcomes that corresponds to the first resulting combination of roll outcomes;*

*rolling the second group of dice;*

*summing the numerical values of the roll outcomes of the dice in the rolled second group of dice to produce a second sum;*

*paying winnings based on wagers on a number in the predetermined group of numbers that is equal to the second sum;*

*combining the roll outcomes of the rolled second group of dice to arrive at a second resulting combination of roll outcomes and paying winnings based on wagers on the one of the plurality of possible combinations of roll outcomes that corresponds to the second resulting combination of roll outcomes;*

*summing the first and second sums to produce a total sum;*

*paying winnings based on wagers on a number in the predetermined group of numbers that is equal to the total sum; and*

*combining the roll outcomes of all of the dice in the rolled first and second groups of dice to arrive at a third resulting combination of roll outcomes and paying winnings based on wagers on the one of the plurality of possible combinations of roll outcomes that corresponds to the third resulting combination of roll outcomes.*

*28. A method of playing a wagering game, comprising:*

*providing a first group of simulated dice and a second group of simulated dice, each simulated die having a plurality of possible roll outcomes wherein each roll outcome represents a particular numerical value;*

*providing a number that is in a predetermined group of numbers and a first wager that corresponds to the first number;*

*providing at least one of a plurality of possible combinations of roll outcomes that can result from either a roll of the first group of simulated dice or a roll of both the first and second simulated groups of dice and a second wager that corresponds to the at least one of a plurality of possible combinations of roll outcomes;*

*simulating rolling the first group of simulated dice;*

*providing a first sum that is equal to the sum of the numerical values represented by the roll outcomes of the simulated dice in the rolled first group of simulated dice;*

*awarding winnings to a player based on the provided first wager if the provided number is equal to the first sum;*

*combining the roll outcomes of all of the simulated dice of the rolled first group of simulated dice to arrive at a first resulting combination of roll outcomes;*

*awarding winnings to a player based on the provided second wager if the at least one of a plurality of possible combinations of roll outcomes is the same as the first resulting combination of roll outcomes;*

*simulating rolling the second group of simulated dice;*

*providing a second sum that is equal to the sum of the numerical values of the roll outcomes of the simulated dice in the rolled second group of simulated dice;*

*awarding winnings to a player based on the provided first wager if the provided number is equal to the second sum;*

*combining the roll outcomes of all the simulated dice of the rolled second group of simulated dice to arrive at a second resulting combination of roll outcomes;*

*awarding winnings to a player based on the provided second wager if the at least one of the plurality of possible combinations of roll outcomes is the same as the second resulting combination of roll outcomes;*

*providing a total sum that is equal to the first and second sums;*

*paying winnings based on the provided first wager if the provided number is equal to the total sum;*

*combining the roll outcomes of all of the simulated dice in the rolled first and second groups of simulated dice to arrive at a third resulting combination of roll outcomes; and*

*awarding winnings to a player based on the provided second wager if the at least one of the plurality of possible combinations of roll outcomes is the same as the third resulting combination of roll outcomes.*

*29. The method according to claim 28 wherein the predetermined group of numbers comprises numbers between 3 and 35, inclusive.*

*30. The method according to claim 28 wherein one of the possible combinations of roll outcomes corresponds to a poker-like hand of three-of-a-kind wherein three simulated dice have the same roll outcome.*

*31. The method according to claim 28 wherein one of the possible combinations of roll outcomes corresponds to a poker-like hand of four-of-a-kind wherein four simulated dice have the same roll outcome.*

*32. The method according to claim 28 wherein one of the possible combinations of roll outcomes corresponds to a poker-like hand of five-of-a-kind wherein five simulated dice have the same roll outcome.*

*33. The method according to claim 28 wherein one of the possible combinations of roll outcomes corresponds to a poker-like hand of a straight wherein the simulated dice have roll outcomes in numerical order.*

*34. The method according to claim 28 wherein one of the possible combinations of roll outcomes corresponds to a poker-like hand of three pairs wherein each simulated die in a first pair of simulated dice has a first roll outcome, each simulated die in a second pair of simulated dice has a second roll outcome, and each simulated die in a third pair of simulated dice has a third roll outcome.*

*35. The method according to claim 28 wherein one of the possible combinations of roll outcomes corresponds to a poker-like hand of six-of-a-kind wherein six simulated dice have the same roll outcome.*

*36. The method according to claim 28 wherein one of the possible combinations of roll outcomes is six simulated dice all having a roll outcome with the numerical value of six.*

* * * * *